(12) United States Patent
Salguero et al.

(10) Patent No.: US 8,642,218 B2
(45) Date of Patent: Feb. 4, 2014

(54) COATING INCLUDING SILICA BASED MATERIAL WITH PENDENT FUNCTIONAL GROUPS

(75) Inventors: Tina T. Salguero, West Hills, CA (US); Thomas B. Stanford, Columbus, OH (US); Jennifer J. Zinck, Calabasas, CA (US)

(73) Assignee: GM Global Technology Operations LLC, Detroit, MI (US)

(*) Notice: Subject to any disclaimer, the term of this patent is extended or adjusted under 35 U.S.C. 154(b) by 1647 days.

(21) Appl. No.: 11/832,409

(22) Filed: Aug. 1, 2007

(65) Prior Publication Data

US 2008/0095928 A1 Apr. 24, 2008

Related U.S. Application Data

(60) Provisional application No. 60/839,246, filed on Aug. 22, 2006.

(51) Int. Cl.
*H01M 8/00* (2006.01)
*H01M 8/24* (2006.01)
*B05D 5/12* (2006.01)

(52) U.S. Cl.
USPC ............................ 429/400; 429/457; 427/115

(58) Field of Classification Search
None
See application file for complete search history.

(56) References Cited

U.S. PATENT DOCUMENTS

| | | | |
|---|---|---|---|
| 3,658,581 A | 4/1972 | Paul et al. | |
| 5,139,601 A * | 8/1992 | Holmes-Farley et al. | 156/329 |
| 5,562,949 A | 10/1996 | Steele et al. | |
| 6,242,135 B1 * | 6/2001 | Mushiake | 429/304 |
| 6,746,982 B2 | 6/2004 | Hertel et al. | |
| 2004/0106034 A1 | 6/2004 | Bekkedahl et al. | |
| 2004/0237833 A1 | 12/2004 | Sepeur et al. | |
| 2004/0258975 A1 | 12/2004 | Extrand et al. | |
| 2006/0194095 A1 * | 8/2006 | Vyas et al. | 429/38 |

* cited by examiner

*Primary Examiner* — Barbara Gilliam
*Assistant Examiner* — Adam A Arciero
(74) *Attorney, Agent, or Firm* — BrooksGroup

(57) ABSTRACT

A coating including a silica-based material having pendent functional groups.

17 Claims, 7 Drawing Sheets

COATING INCLUDING SILICA BASED MATERIAL WITH PENDENT FUNCTIONAL GROUPS

CROSS REFERENCE TO RELATED APPLICATIONS

This application claims the benefit of U.S. Provisional Application Ser. No. 60/839,246 filed Aug. 22, 2006.

TECHNICAL FIELD

The field to which the disclosure generally relates includes silica coatings, compositions for making the same, products including the same, and methods of making and using such products.

BACKGROUND

The wettability of a surface can be an extremely useful property. For example, hydrophilic surfaces are advantageous in a variety of biomedical, anti-fogging, and heat transfer applications, and hydrophobic surfaces are used in self-cleaning applications.

Wettability is determined by a combination of the chemical composition and the topography of a surface. Chemical interactions at solid-liquid-vapor interfaces determine the interfacial free energy, which in turn determines whether the surface is hydrophilic or hydrophobic. The role of topography is less well understood, but it is well known that roughness amplifies the intrinsic wetting characteristics of a material. This phenomenon has been used to create superhydrophilic and superhydrophobic surfaces.

SUMMARY OF EXEMPLARY EMBODIMENTS OF THE INVENTION

One embodiment of the invention includes a coating including silica with pendent functionality groups.

Other exemplary embodiments of the present invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DESCRIPTION OF EXEMPLARY EMBODIMENTS

The following description of the embodiment(s) is merely exemplary in nature and is in no way intended to limit the invention, its application, or uses.

Figure 1:
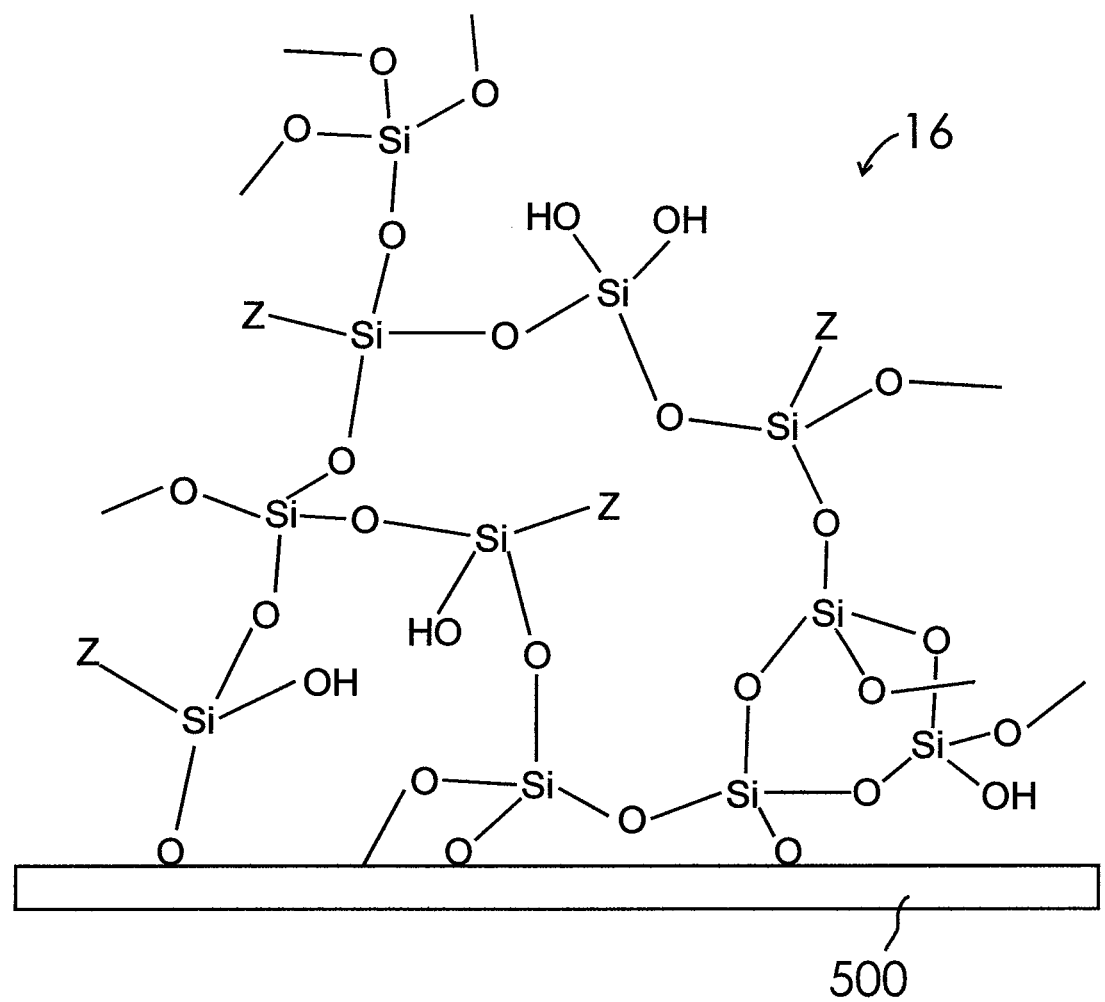
FIG. 1 illustrates the structure of a silica base film with functional groups Z according to one embodiment of the invention.

One embodiment of the invention includes a silica-based coating that incorporates a hydrophilic chemical functionality and hierarchically rough features to create wicking properties. FIG. 1 illustrates one embodiment of the invention including a silica-based coating 16 attached to a substrate 500. In this embodiment of the invention, a silica component 16 provides corrosion resistance and some hydrophilicity, and additional properties may be incorporated by including chemical functionality Z. Judicious choice of Z can provide additional hydrophilicity, porosity, and sites for chemical reaction to occur. Post-activation of the sites can provide more and/or different hydrophilic functionalities and levels of porosity. The functional groups Z may include ionic and ionizable groups, such as hydroxyl, ether, ester, carbonyl, amide, amino, ammonium, sulfonate, sulfonyl, sulfate, sulfite, sulfonamide, carboxylate, phosphate, phosphonate, and halide, among others. These groups are characterized by chemical reactivity and/or polarity. As illustrated in FIG. 1, one embodiment of the invention may include a coating including a material having Si—O repeating units (or siloxane bonds) with pendent functional groups Z.

Another embodiment of the invention includes a method of preparing a coating including the preparation of a sol-gel composed of at least one silica precursor including a functionality group (Z), wherein the precursor(s) undergoes hydrolysis polymerization. In one embodiment of the invention the sol-gel is made from one part by weight of 1 N aqueous hydrochloric acid added to two parts N-(triethoxysilylpropyl) urea (50% in methanol) plus one part tetramethoxysilane. After mixing and allowing the solution to sit at room temperature for 30 minutes to allow hydrolysis to occur, the resultant sol is used to dip-coat coupons or components. Alternatively, the sol can be diluted with one part water and used to spray-coat films ranging from 2 to 20 μm in thickness. In one embodiment, the sol may be cured in air at 100° C. for 45 minutes. Thereafter, the coating may be activated by immersing the coated coupon in an 80° C. water bath for at least 6 hours. This is referred to as activation of wicking.

Figure 2:
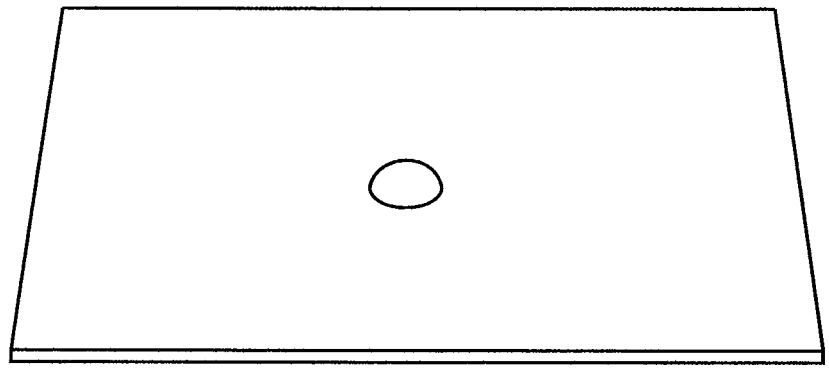
FIG. 2 shows a water drop on a bare stainless steel coupon and a water drop on a coupon including a coating including base silica and functional groups according to one embodiment of the invention.
Figure 2:
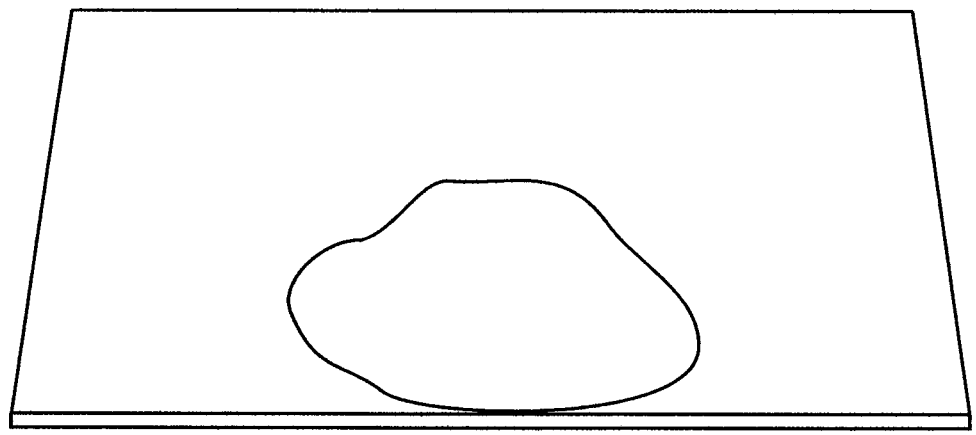
Figure 2:
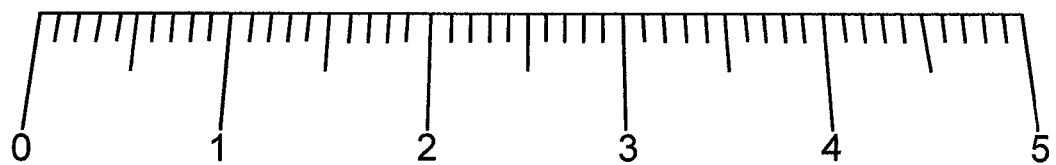

A pair of 316 L stainless steel coupons are shown in FIG. 2. The top image shows a bare coupon (cleaned with detergent, degreased with isopropanol, then treated with UV-ozone for 20 minutes). The contact angle of the 10 μL drop of water on the surface is approximately 35°. The bottom image shows the coupon after dip-coating with a urea-silica sol according to one embodiment, curing and immersing in an 80° C. water bath for 24 hours. The initial contact of the 10 μL drop of water on the coated coupon is approximately 20°, but after a few seconds, the water is wicked into and across the coating.

Figure 3:
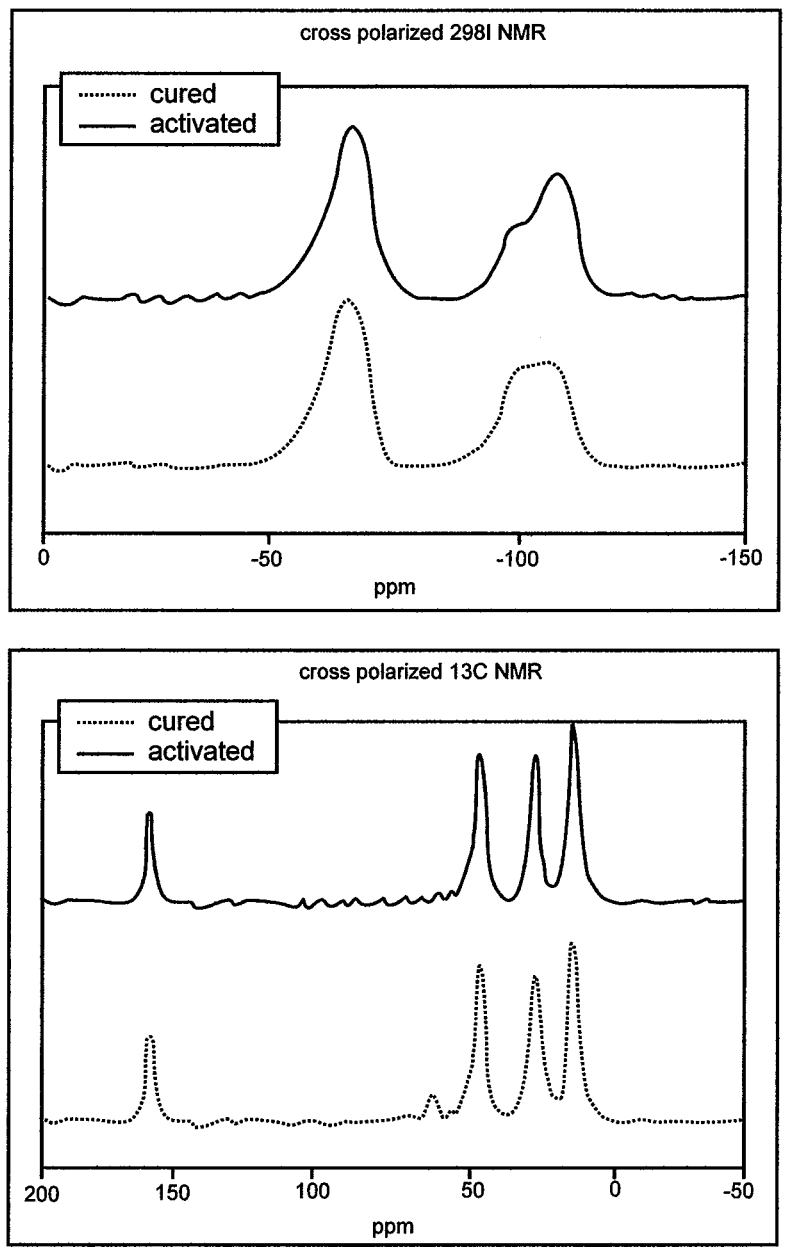
FIG. 3 illustrates solid-state silicon and C NMR spectra of bulk cured and activated urea-silica materials according to one embodiment of the invention.

Solid-state C NMR on the bulk cured and activated materials (FIG. 3) indicates that the N-(silylpropyl) urea functionality remains intact, even after hot water treatment. Solid-state Si NMR (FIG. 2) indicates that the degree of polymerization increases slightly (more $Q^4$) after activation. The intensity of the $SiCH_2$ resonance remains constant, which is also consistent with the C NMR data.

The BET surface area of the bulk activated urea-silica material is relatively large (for example 400 $m^2g^{-1}$), and a pore volume by the BJH nitrogen absorption method is small (0.014 $cm^3g^{-1}$), with the type II isotherm. That material has a sharp pore size distribution, with the average pore diameter of 2.5 nm.

Figure 4B:
FIG. 4 illustrates SIMS images of an activated coating according to one embodiment of the invention at 500×, 6,000× and 35,000× magnifications.
Figure 4A:
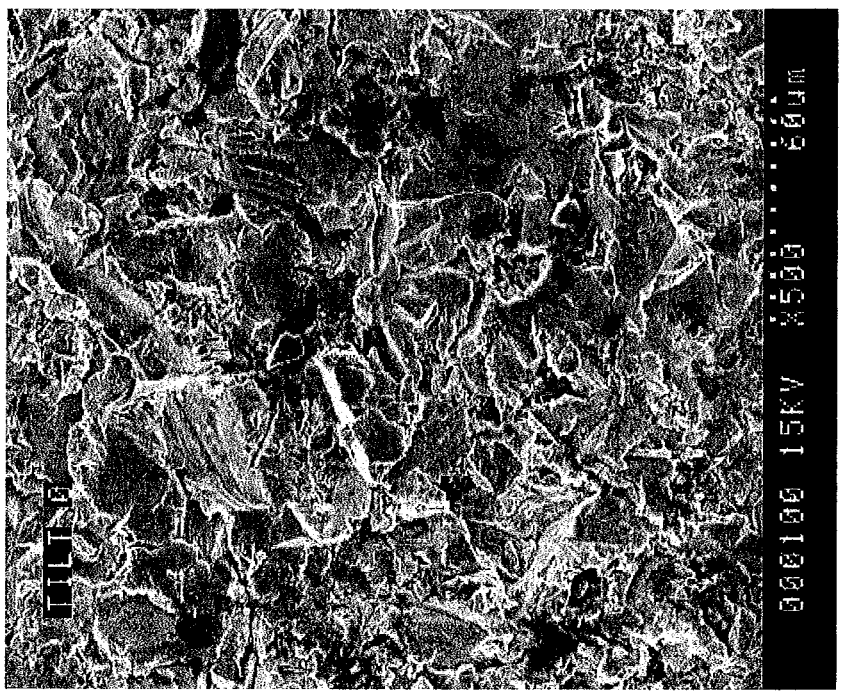
Figure 4C:
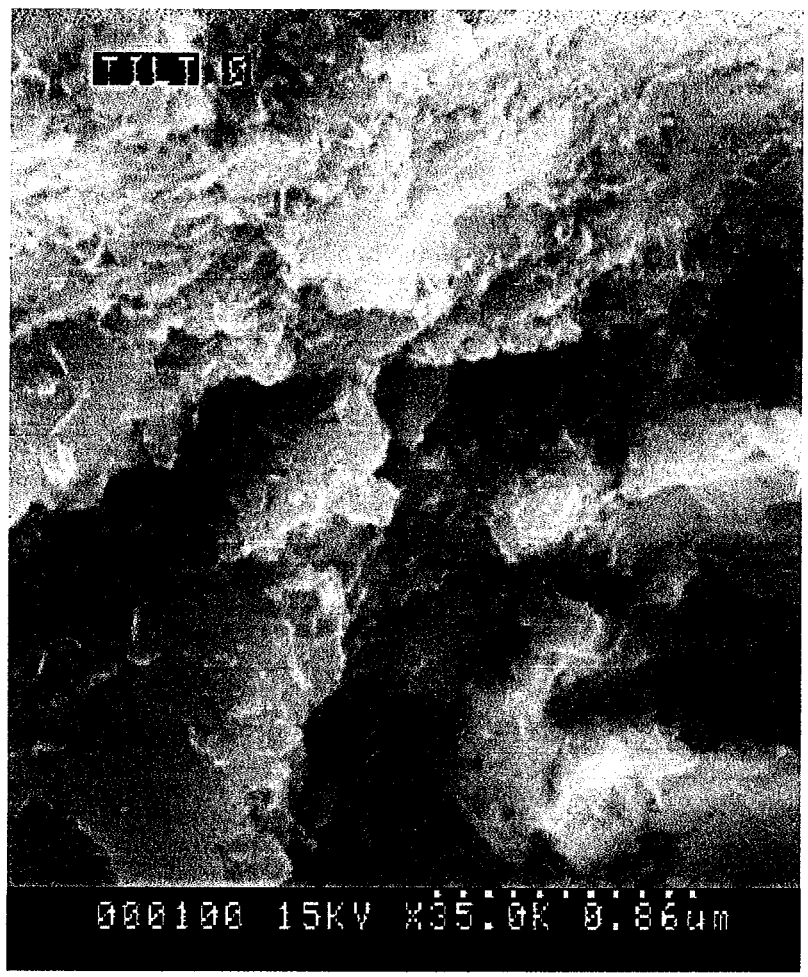

FIGS. 4A-C respectively show the surface of the activated urea-silica film at different magnifications of 500×, 6,000×, and 35,000×. A high degree of roughness is evident at a variety of length scales in each of these images.

The characterization data of one embodiment of the invention indicates that the final activated coating consist of $Q^3$ and $Q^4$ silica plus pendent propylurea groups. The coating contains some nanoporosity and is rough on multiple length scales. It is believed that some of the silica is chemically stabilized through urea-urea hydrogen bonding interactions, while the remainder of the silica undergoes a dissolution/restructuring process during the hot water treatment, which leads to porosity and roughness. Although the material is intrinsically only moderately hydrophilic, the hydrophilicity and wicking properties are greatly enhanced by these topographical features. When a drop of water contacts the surface of the coating, the water is absorbed into the channels and pores of the coating, and at the same time, the remaining water spreads across the silica-water composite. This behavior is known as hemi-wicking.

The coating according to one embodiment of the invention, particularly the urea-silica coating, may be suitable for practical applications and may be applied to large and/or irregular surfaces and its synthesis requires only moderate temperatures, for example below 100° C.

Another embodiment of the invention includes coating a substrate, such as a bipolar plate for a fuel cell, with a silica-based material with pendent functional groups Z and curing the same. Thereafter, the coated substrate may be soaked in an 80° C. water bath or an aqueous solution containing 12.5 ppm sulfuric acid, 1.8 ppm hydrofluoric acid, and 0.05 M potassium hydrogen phosphate buffer at 80° C. (simulated conditions at the fuel cell bipolar plate) for 6 hours to activate the coating. In a suitable test for evaluating the wetting and wicking properties, a 10 µL of water is placed on the coated coupon, and the diameter of the drop is measured when it reaches equilibrium (i.e., after it stops spreading). A diameter of at least 14 mm is preferred. Such a test was conducted on an activated urea-silica coating according to one embodiment of the invention and the results showed that the coating is ultra-hydrophilic (contact angle of approximately 0°) and has outstanding wicking properties wherein the 10 µL drop size reaches approximately 25×14 mm.

Figure 5:
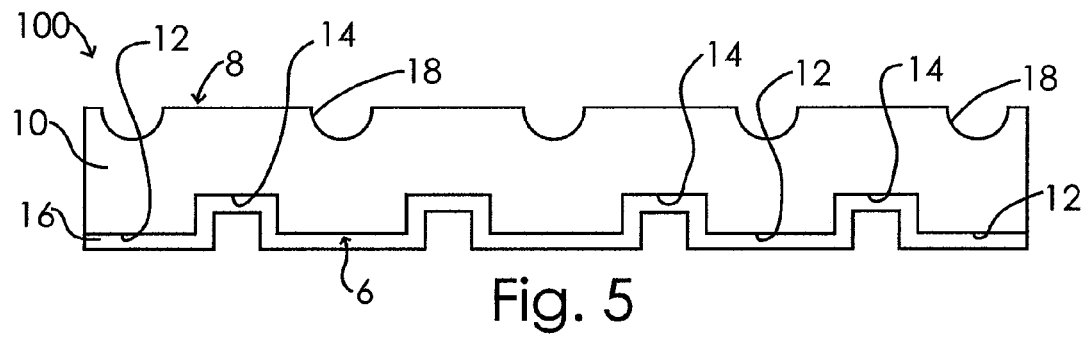
FIG. 5 illustrates a fuel bipolar plate having a coating thereon according to one embodiment of the invention.

Referring now to FIG. 5, one embodiment of the invention includes a fuel cell component 100 such as a bipolar plate 10 having a first face 6 and an opposite second face 8. The first face 6 includes a plurality of lands 12 and channels 14 defined therein to allow fuel cell reactant gases to flow through the channels 14 of the bipolar plate. The second face 8 of the bipolar plate 10 may include a plurality of cooling fluid channels 18 defined therein. The lands 12, reactant gas channels 14 or cooling fluid channels 18 may be formed in a substrate by machining, etching or stamping or the like. A sol-gel film 16 is deposited over at least portions of the first face 6 of the bipolar plate 10 and cured. In the embodiment shown in FIG. 1, the sol-gel film 16 is selectively deposited over the channels 14 and the surface forming the channels 14 of the first face 6. After the film is cured to a solid porous coating, the coating may be activated by exposing the coating to water (e.g., by immersing the coated bipolar plate in water) for an extended period of time such as for one hour.

Figure 6:
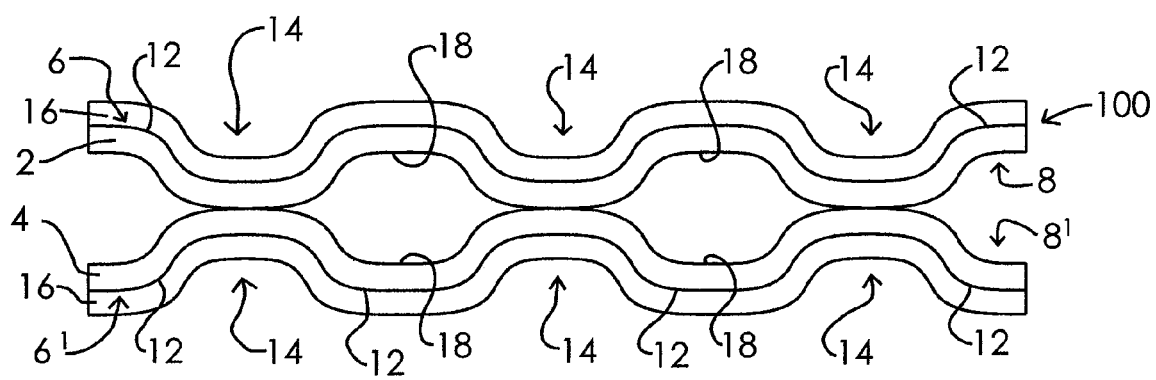
FIG. 6. illustrates a fuel bipolar plate having a coating thereon according to another embodiment of the invention.

Referring now to FIG. 6, another embodiment of the invention includes a bipolar plate including a first thin metal sheet 2 and a second thin metal sheet 4 which each have been stamped or formed to provide a plurality of lands 12 and channels 14 in first and second faces 6, $6^1$ respectively. Cooling channels 18 may be provided in second faces 8, $8^1$ respectively, of the first metal sheet 2 and the second metal sheet 4. The sol-gel film 16 may be deposited over the entire surface of the first faces 6, $6^1$ or may be selectively deposited over portions of the first faces 6, $6^1$. For example, the sol-gel film 16 may be selectively deposited only on the channels 14 of the first metal sheet 2 and the second metal sheet 4.

Figure 7:
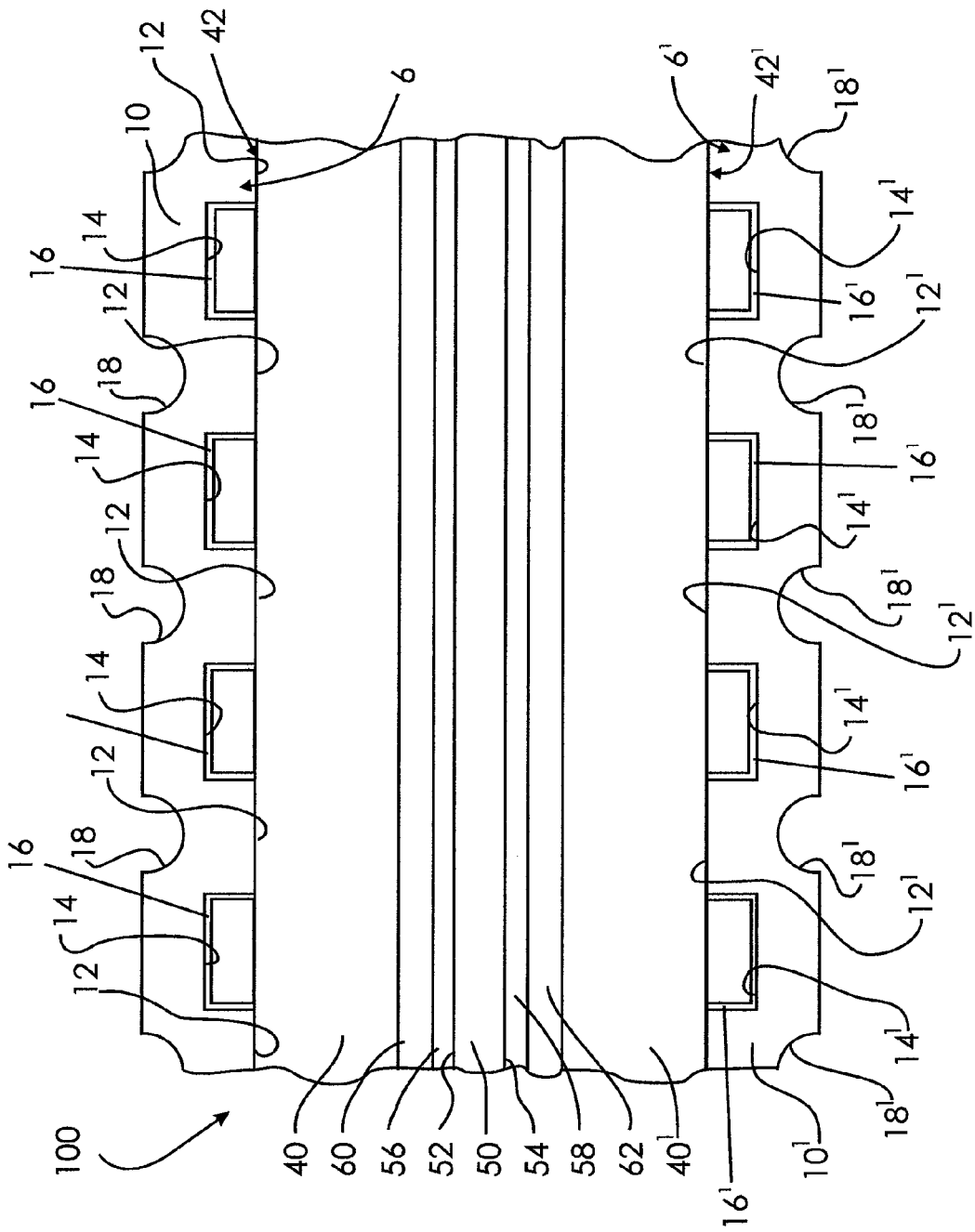
FIG. 7 illustrate a portion of a fuel cell stack having a coating selectively deposited over portions of a bipolar plate according to one embodiment of the invention.

Referring now to FIG. 7, another embodiment of the invention includes a product 100 including a solid polymer electrolyte membrane 50 having a first face 52 and an opposite second face 54. An anode 56 is provided over the first face 52 of the solid polymer electrolyte membrane 50. A first gas diffusion media layer 40 may be provided over the anode 56, and optionally a first microporous layer 60 may be interposed between the first gas diffusion media layer 40 and the anode 56. A first bipolar plate 10 having a plurality of lands 12 and channels 14 formed in a first face thereof is provided over the first gas diffusion media layer 40. A coating including a silica-based material having pendent functional groups 16 is interposed between the first gas diffusion media layer 40 and the first face 6 of the first bipolar plate 10. The coating 16 may cover the entire first face 42 of the gas diffusion media layer 40 or the coating 16 may cover the entire first face 6 of the bipolar plate. Optionally, as shown in FIG. 7, the coating 16 may be selectively deposited on portions of the first face 6 of the bipolar plate 10 or selectively deposited on portions of the first face 42 of the gas diffusion media layer 40. A cathode 58 may underline the second face 54 of the solid polymer electrolyte membrane 50. A second gas diffusion media layer $40^1$ may underline the cathode layer 58, and optionally a second microporous layer 62 may be interposed between the second gas diffusion media layer $40^1$ and the cathode 58. A second bipolar plate $10^1$ is provided and includes a plurality of lands $12^1$ and channels $14^1$ formed in a first face $6^1$ thereof. A second coating including a silica-based material having pendent functional groups $16^1$ is interposed between the first face $6^1$ of the second bipolar plate $10^1$ and the second gas diffusion media layer $40^1$. The coating 16, $16^1$ may be applied to the first face $42^1$ of the second gas diffusion media layer $40^1$ or to the first face $6^1$ of the second bipolar plate $10^1$ by dipping, spraying, rolling, screen printing or the like. A removable mask may be used to selectively deposit the coatings 16, $16^1$ onto or over the bipolar plates 10, $10^1$ or gas diffusion media layers 40, $40^1$.

When the terms "over", "overlying", "overlies", or "under", "underlying", "underlies" are used with respect to the relative position of a first component or layer with respect to a second component or layer, such shall mean that the first component or layer is in direct contact with the second component or layer, or that additional layers or components are interposed between the first component or layer and the second component or layer.

The above description of embodiments of the invention is merely exemplary in nature and, thus, variations thereof are not to be regarded as a departure from the spirit and scope of the invention.

What is claimed is:
1. A method comprising:
   mixing one part by weight of 1 N aqueous hydrochloric acid added to two parts N-(triethoxysilylpropyl) urea and one part tetramethoxysilane into a first solution;

allowing the solution to sit to allow hydrolysis to occur to form a sol-gel solution;

applying the sol-gel solution to a fuel cell component to provide a sol-gel film on the fuel cell component and curing the sol-gel film to provide a coating on the fuel cell component, and activating the coating comprising exposing the coating to water.

2. A method as set forth in claim 1 wherein the applying comprises diluting the first solution with water and spraying the sol-gel solution onto the fuel cell component to a thickness ranging from 2 to 20 μm.

3. A method as set forth in claim 1 further comprising curing the sol-gel solution in air at a temperature ranging from about 85-120° C.

4. A method as set forth in claim 1 further comprising curing the sol-gel solution at a temperature about room temperature to form a cured coating and activating the cured coating comprising immersing the coated component in water bath for at least one hour.

5. A method as set forth in claim 1 wherein:

coating comprising a silica-based material including plurality of functional pendent groups.

6. A method as set forth in claim 5 wherein at least one of the plurality of functional pendent groups comprises a urea group.

7. A method as set forth in claim 5 wherein at least one of the plurality of functional pendent groups comprises a propylurea group.

8. A method as set forth in claim 5 wherein the coating is a urea-silica coating.

9. A method as set forth in claim 5 wherein each one of the plurality of the functional pendent groups comprises an ionic or ionizable group.

10. A method as set forth in claim 5 wherein each one of the plurality of the functional pendent groups comprises an hydroxyl, ether, ester, carbonyl, amide, amino, ammonium, sulfonate, sulfonyl, sulfate, sulfite, sulfonamide, carboxylate, phosphate, phosphonate, or halide group.

11. A method as set forth in claim 4 wherein the fuel cell component comprises a fuel cell bipolar plate.

12. A method as set forth in claim 4 wherein the fuel cell component comprises a fuel cell bipolar plate and wherein the coating is selectively deposited over portions of the fuel cell bipolar plate.

13. A method as set forth in claim 4 wherein the fuel cell component comprises a fuel cell bipolar plate comprising a first face defining a reactant gas flow field including a plurality of lands and channels and wherein the coating is selectively deposited over the channels of the fuel cell bipolar plate.

14. A method as set form in claim 4 wherein the fuel cell component comprises a fuel cell gas diffusion media and coating is on a surface of the gas diffusion media.

15. A method as set forth in claim 4 further comprising placing a fuel cell bipolar plate over the coating wherein the fuel cell bipolar plate includes a reactant gas flow field defined in a surface of the plate, and wherein the surface of the plate having the reactant gas flow field defined therein is adjacent the coating.

16. A method comprising:

mixing one part by weight of 1 N aqueous hydrochloric acid added to two parts N-(triethoxysilylpropyl) urea and one part tetramethoxysilane into a first solution;

allowing the solution to sit to allow hydrolysis to occur to form a sol-gel solution;

applying the sol-gel solution to a fuel cell component to provide a sol-gel film on the fuel cell component and curing the sol-gel film to provide a coating on the fuel cell component, and activating the coating comprising exposing the coating to water wherein the coating is porous.

17. A method as set forth in claim 1 further comprising curing the sol-gel solution at a temperature about room temperature to form a cured coating and activating the cured coating comprising immersing the coated component in water.

* * * * *